(12) United States Patent
Yamamoto et al.

(10) Patent No.: US 8,444,530 B2
(45) Date of Patent: May 21, 2013

(54) AUTOMATIC TRANSMISSION SYSTEM AND HYDRAULIC CONTROL DEVICE AND METHOD THEREOF

(75) Inventors: Hideharu Yamamoto, Fujinomiya (JP); Kenichi Kaizu, Fuji (JP); Hideki Ishii, Numazu (JP); Toshiomi Nebashi, Fuji (JP); Fumitaka Nagashima, Fuji (JP); Ryusuke Ooshiro, Shizuoka (JP)

(73) Assignee: JATCO Ltd, Fuji-shi (JP)

( * ) Notice: Subject to any disclaimer, the term of this patent is extended or adjusted under 35 U.S.C. 154(b) by 952 days.

(21) Appl. No.: 12/540,095

(22) Filed: Aug. 12, 2009

(65) Prior Publication Data
US 2010/0057315 A1 Mar. 4, 2010

(30) Foreign Application Priority Data
Aug. 27, 2008 (JP) .................. 2008-218543

(51) Int. Cl.
F16H 59/30 (2006.01)
(52) U.S. Cl.
USPC ........................................ 477/122
(58) Field of Classification Search
USPC .... 477/98, 156, 158, 162, 163, 164; 475/159; 74/467; 184/6, 6.1
See application file for complete search history.

(56) References Cited

U.S. PATENT DOCUMENTS

| 3,308,677 | A  | * | 3/1967  | Van Lent et al. ................. 477/97 |
| 6,740,000 | B2 |   | 5/2004  | Wakayama |
| 6,830,527 | B2 | * | 12/2004 | Wakayama .................... 475/161 |
| 7,976,419 | B2 | * | 7/2011  | Hartinger et al. ............. 475/159 |
| 8,057,355 | B2 | * | 11/2011 | Tryon et al. ...................... 477/52 |
| 2002/0128107 | A1 |  | 9/2002  | Wakayama |

FOREIGN PATENT DOCUMENTS

| EP | 0 978 668 A1   | 2/2000 |
| JP | 2002-266993 A  | 9/2002 |
| JP | 2007-064268 A  | 3/2007 |

* cited by examiner

Primary Examiner — David D Le
Assistant Examiner — David J Hlavka
(74) Attorney, Agent, or Firm — Foley & Lardner LLP

(57) ABSTRACT

An automatic transmission system includes a transmission having transmission elements with lubrication-requiring portions and hydraulic actuators therefor, a switching valve that supplies hydraulic fluid to the hydraulic actuators, a valve actuator that actuates the switching valve, a shift range detection unit that detects a selected shift range of the transmission, and a control unit that controls the valve actuator to actuate the switching valve in accordance with the selected transmission shift range. The switching valve has a bypass position to provide a supply of the hydraulic fluid to the lubrication-requiring portions by bypassing a transmission oil cooler. The control unit judges whether the transmission is in a low lubrication state based on a given operating parameter of the transmission and controls the valve actuator to switch the switching valve to the bypass position at the time the transmission is judged as being in the low lubrication state.

8 Claims, 4 Drawing Sheets

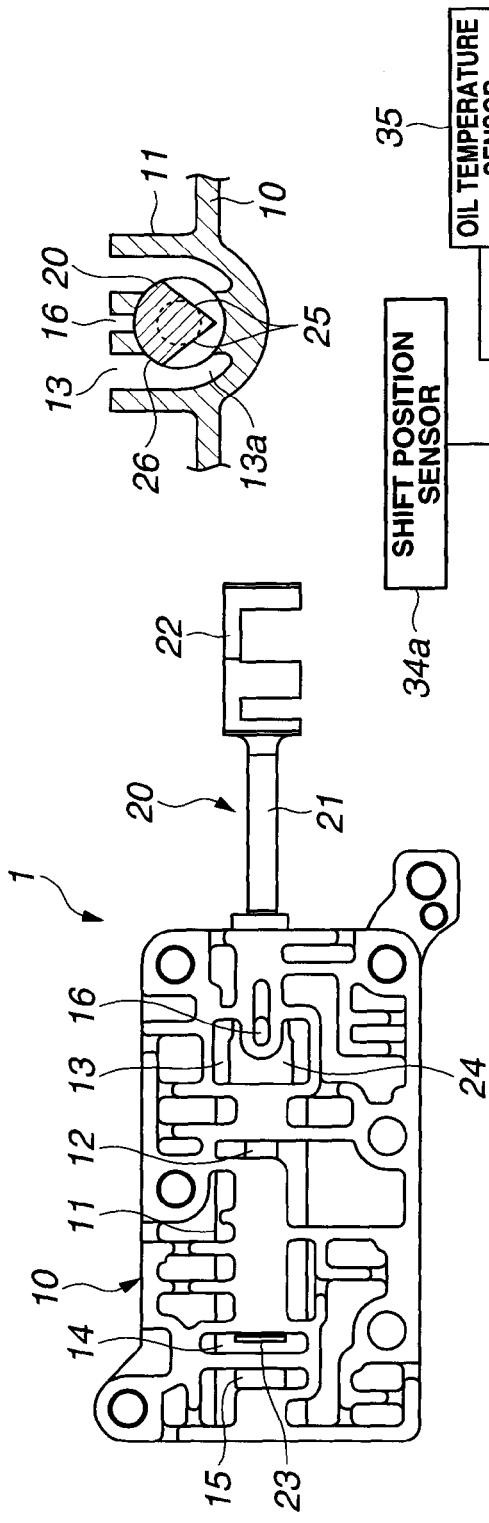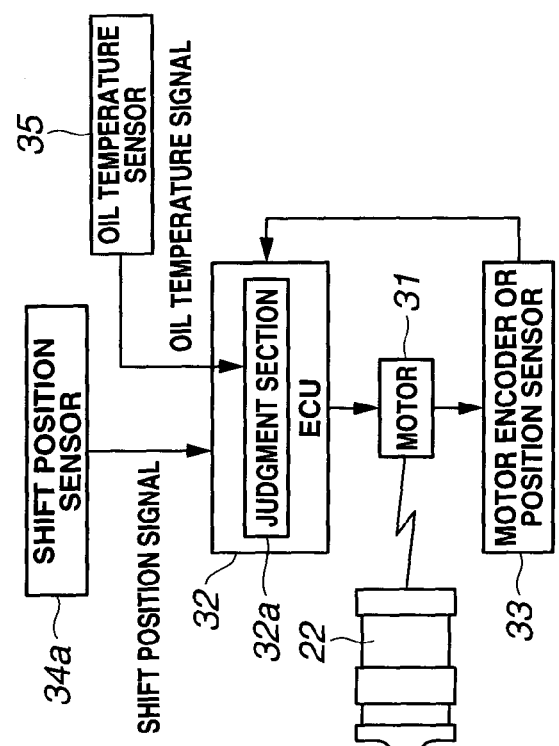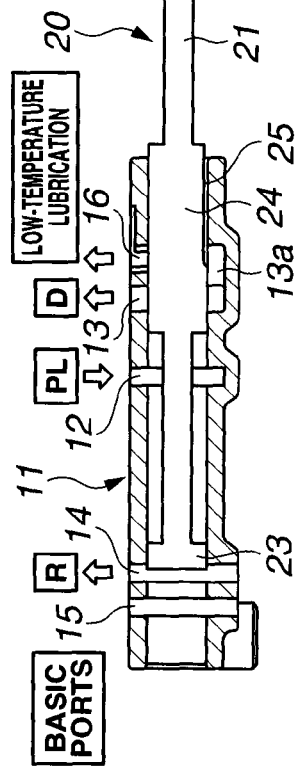

AUTOMATIC TRANSMISSION SYSTEM AND HYDRAULIC CONTROL DEVICE AND METHOD THEREOF

BACKGROUND OF THE INVENTION

The present invention relates to an automatic transmission system of an automotive vehicle etc. having an oil cooler to cool transmission oil. The present invention also relates to a hydraulic control device and method for an automatic transmission.

Japanese Laid-Open Patent Publication No. 2007-64268 disclose one type of automatic transmission system, which includes a transmission having a plurality of transmission elements such as gear trains, multiple disc clutches/brakes, belt drives etc. and a hydraulic control device having a manual valve, a valve actuator such as a motor, a shift position sensor and a control unit that controls the valve actuator to actuate the manual valve such that the manual valve switches a supply of hydraulic fluid to hydraulic actuators of the transmission elements based on a detection signal from the shift position sensor. This configuration makes it possible to secure assured shift control of the transmission according to driver's shift lever operation and provide flexibility in vehicle interior/body layout design.

The transmission elements have sliding portions that require to be lubricated with lubricating oil so as to ensure smooth operations and prevent heat generations for improvement in transmission durability. As the lubricating oil increases in temperature by absorption of heat from the transmission elements and thereby decreases in lubrication performance during use, the automatic transmission system is equipped with an oil cooler to cool the lubricating oil and maintain the lubrication performance of the lubricating oil.

However, the viscosity of the lubricating oil increases as the lubricating oil gets cooled down. When the temperature of the lubricating oil becomes too low, a required amount of lubricating oil cannot be supplied to the lubrication-requiring portions of the transmission elements due to viscous drag. This results in deterioration of the transmission durability. In particular, the length of passage of the lubricating oil to the lubrication-requiring transmission portions increases with the flow of the lubricating oil through the oil cooler so that the amount of lubricating oil supplied to the lubrication-requiring transmission portions becomes reduced with increase in flow resistance.

In view of this problem, Japanese Laid-Open Patent Publication No. 2002-266993 proposes that the automatic transmission system has a hydraulic circuit equipped with a cooler bypass valve to bypass the oil cooler and supply the lubricating oil to the lubrication-requiring transmission portions without passing the lubricating oil through the oil cooler upon judging that the viscosity of the lubricating oil becomes high e.g. when the transmission line pressure exceeds a reference value.

SUMMARY OF THE INVENTION

In order to mount the cooler bypass valve in a valve body of the transmission hydraulic circuit, it is necessary to provide not only an installation space for the cooler bypass valve but component additions such as a valve spring and a valve retainer for the cooler bypass valve. It is also necessary to perform an additional manufacturing process such as boring on the valve body in order to mount the cooler bypass valve in the valve body. There thus arise problems such as increases in system size, parts count and manufacturing cost and substantial changes in valve body design. In the case where the cooler bypass valve is mounted on the valve body, it is most efficient to use hydraulic pressure in the valve body for opening/closing control of the cooler bypass valve. In this case, however, the opening/closing condition of the cooler bypass valve depends on the hardware specifications of the valve body and may not be set optimally due to low flexibility in bypass opening.

It is accordingly an object of the present invention to provide an automatic transmission system that allows transmission lubricating oil to bypass a transmission oil cooler under optimal conditions without increases in system size and parts count and substantial changes in equipment design. It is also an object of the present invention to provide a hydraulic control device and method for an automatic transmission.

According to an aspect of the present invention, there is provided an automatic transmission system, comprising: a transmission having a plurality of transmission elements with lubrication-requiring portions and hydraulic actuators therefor; a hydraulic circuit having a switching valve that switches a supply hydraulic fluid to the hydraulic actuators; a valve actuator that actuates the switching valve; an oil cooler disposed on a lubricating oil supply line to the lubrication-requiring portions; a shift range detection unit that detects a shift range of the transmission selected by a driver; and a control unit that controls the valve actuator to actuate the switching valve in accordance with the selected transmission shift range, the switching valve having a bypass position to supply the hydraulic fluid from the switching valve to the lubrication-requiring portions by bypassing the oil cooler; and the control unit having a judgment section to judge whether the transmission is in a low lubrication state in which an amount of the lubricating oil supplied to the lubrication-requiring portions is smaller than a given amount based on a given operating parameter of the transmission and being configured to control the valve actuator to switch the switching valve to the bypass position at the time the judgment section judges that the transmission is in the low lubrication state.

According to another aspect of the present invention, there is provided a hydraulic control device of an automatic transmission, the automatic transmission having a plurality of transmission elements with lubrication-requiring portions and hydraulic actuators therefor and an oil cooler to cool lubricating oil, the hydraulic control device comprising: a bypass line bypassing the oil cooler and extending to the lubrication-requiring portions; a switching valve having hydraulic fluid supply ports that supply hydraulic fluid to the hydraulic actuators and a lubrication port that communicates with the bypass line to allow a supply of the hydraulic fluid to the lubrication-requiring portions through the bypass line; a shift range detection unit for detecting a shift range of the transmission selected by a driver; a parameter detection unit for detecting a given parameter of the transmission; and a control unit for judging a lubrication state of the transmission based on the given transmission parameter and controlling the switching valve to selectively open and close the hydraulic fluid supply ports and the lubrication port depending on the selected shift range of the transmission and the lubrication state of the transmission.

According to still another aspect of the present invention, there is provided a hydraulic control method of an automatic transmission, the automatic transmission having a plurality of transmission elements with lubrication-requiring portions and hydraulic actuators therefor and an oil cooler to cool lubricating oil, the hydraulic control method comprising: forming a bypass line bypassing the oil cooler and extending to the lubrication-requiring portions; providing a switching valve having hydraulic fluid supply ports that supply hydraulic fluid to the hydraulic actuators and a lubrication port that communicates with the bypass line to allow a supply of the hydraulic fluid to the lubrication-requiring portions through the bypass line; detecting a shift range of the transmission selected by a driver; detecting a given parameter of the transmission; judging a lubrication state of the transmission based on the given transmission parameter; and controlling the switching valve to selectively open and close the hydraulic fluid supply ports and the lubrication port depending on the selected shift range of the transmission and the lubrication state of the transmission.

The other objects and features of the present invention will also become understood from the following description.

BRIEF DESCRIPTION OF THE DRAWINGS

FIG. 1A is a plan view of a switching valve of an automatic transmission system according to one embodiment of the present invention.

FIG. 1B is a schematic view of the switching valve of FIG. 1A and its actuation mechanism.

FIG. 1C is a section view of the switching valve of FIGS. 1A and 1B.

DESCRIPTION OF THE EMBODIMENTS

The present invention will be described in detail below with reference to the drawings.

Figure 2:
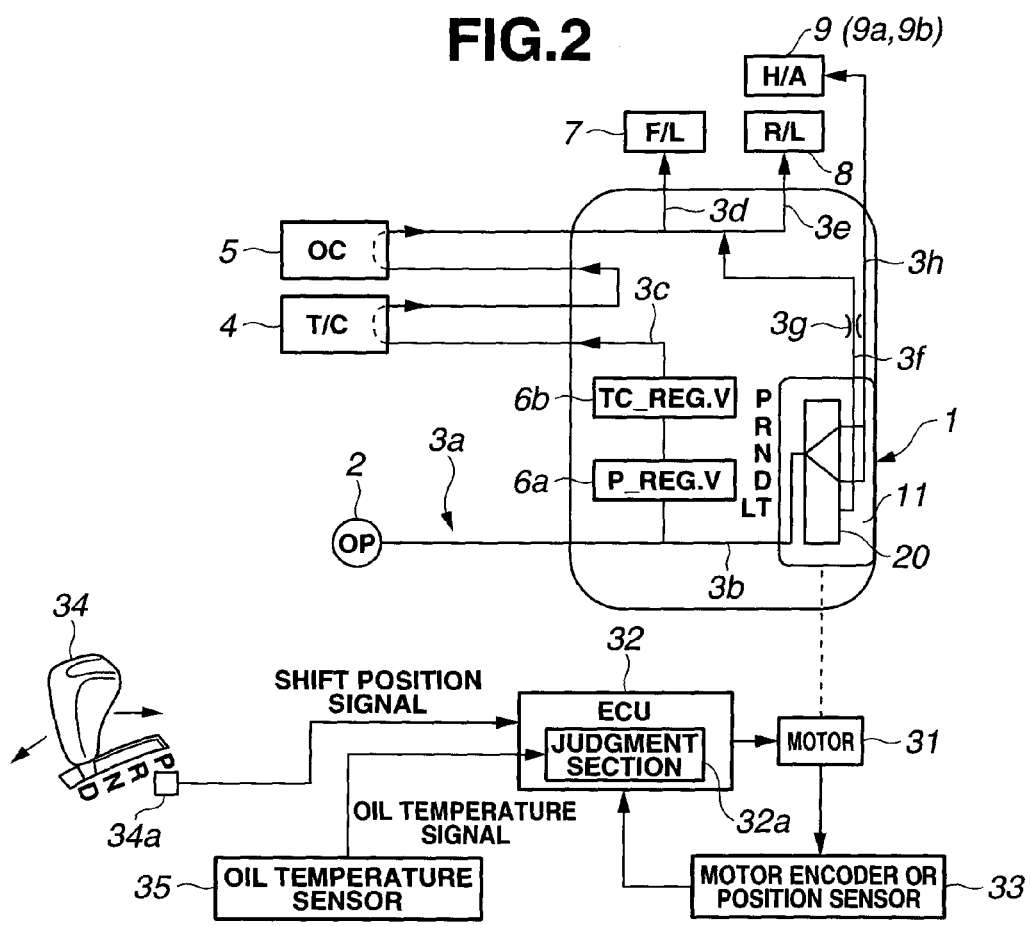
FIG. 2 is a block diagram of the automatic transmission system according to one embodiment of the present invention.

Referring to FIG. 2, an automatic transmission system of an automotive vehicle according to one embodiment of the present invention includes a transmission in which a plurality of transmission elements have sliding portions 7 and 8 and hydraulic actuators 9 (e.g. hydraulic chambers) to actuate the transmission elements and thereby establish a power transmission path from an engine to drive wheels according to a position of a shift lever 34, i.e., a shift range of the transmission selected by a vehicle driver. Herein, the transmission has a plurality of shift ranges such as P range (parking range), N range (neutral range), D range (forward drive range) including a first speed, a second speed and other forward drive speeds and R range (reverse drive range). The shift lever 34 has a plurality of operating positions such as P-range position, N-range position, D-range position and R-range position corresponding to the respective transmission shift ranges and arranged in this order in an operation direction of the shift lever 34 as shown in FIG. 2. Further, the transmission elements refer to, but are not limited to, gear trains, multiple disc clutches/brakes, bearings, belt drives and the like. The sliding portions 7 and 8 of these transmission elements require lubrication to secure smooth operations and prevent frictional heat generations for improvement in transmission durability and thus are hereinafter referred to as "lubrication-requiring transmission portions". For convenience of explanation, the lubrication-requiring transmission portions 7 and 8 located in front and rear sides of the vehicle are called "front and rear lubrication-requiring transmission portions".

The automatic transmission system further includes a hydraulic circuit having a valve body 10 equipped with a manual valve 1 (as a switching valve), first and second pressure regulator valves 6a and 6b and hydraulic lines 3a to 3f and 3h, an oil pump 2, a torque converter 4, an oil cooler 5, a motor 31 (as a valve actuator) and a switchover control unit 32.

Automatic transmission fluid (ATF) is pressurized and fed by the oil pump 2 to the valve body 10 through the hydraulic line 3a.

The hydraulic pressure from the oil pump 2 is regulated by the first pressure regulating valve 6a and introduced as a high line pressure to the manual valve 1 through the hydraulic line 3b. The line pressure is then selectively supplied from the manual valve 1 to any of the hydraulic actuators 9 of the transmission elements through the hydraulic line 3h according to the position of the shift lever 34, i.e., the selected shift range of the transmission. (For convenience, only one hydraulic line 3h is shown in the drawing.) On the other hand, the hydraulic pressure drained from the first pressure regulating valve 6a is regulated by the second pressure regulating valve 6a and introduced as a torque converter operating pressure to the torque converter 4 through the hydraulic line 3c.

The ATF, after used for operation of the torque converter 4, is returned to the valve body 10, fed to and cooled by the oil cooler 5, returned again to the valve body 10, and then, supplied to the lubrication-requiring transmission portions 7 and 8 through the hydraulic lines 3d and 3e. In a specific low lubrication state (explained in detail later), however, the ATF is directly supplied from the manual valve 1 to the lubrication-requiring transmission portions 7 and 8 through the hydraulic line 3f and the hydraulic lines 3d and 3e. As shown in FIG. 1, the hydraulic line 3f bypasses the oil cooler 5 and connects the manual valve 1 directly to the hydraulic lines 3d and 3e. This bypass line 3f is equipped with an orifice 3g to regulate the amount of the ATF supplied to the lubrication-requiring transmission portions 7 and 8.

More specifically, the manual valve 1 is configured to switch a supply of the ATF as lubricating oil to the lubrication-requiring transmission portions 7 and 8 and as hydraulic fluid to the hydraulic transmission actuators 9. As shown in FIGS. 1A, 1B and 1C, the manual valve 1 includes a spool accommodation portion 11 formed in the valve body 10 and a valve spool 20 movably accommodated in a cylindrical valve bore (as a spool chamber) of the spool accommodation portion 11 and connected to the motor 31.

The spool accommodation portion 11 has a plurality of valve ports including a line pressure port 12, a D-range port 13, a R-range port 14, a drain port 15 as usual and additionally a bypass port (low temperature lubrication port) 16, which is characteristic to the manual valve 1 of the present invention. The line pressure port 12 is open to and communicates with the valve bore and the hydraulic line 3a so as to receive and introduce the line pressure from the pressure regulator valve 6a to the valve bore. The D-range port 13 is open to and communicates with the valve bore and the hydraulic line 3h so as to supply the line pressure from the valve bore to any of the hydraulic transmission actuators 9 for shifting the transmission to the D range (referred to as "D-range transmission actuator 9a"). The R-range port 14 is open to and communicates with the valve bore and the other hydraulic line 3h so as to supply the line pressure from the valve bore to any of the hydraulic transmission actuators 9 for shifting the transmission to the R range (referred to as "R-range transmission actuator 9b"). The drain port 15 is open to and communicates with the valve bore so as to drain the ATF from the R-range port 14. The bypass port (lubrication port) 16 is open to and communicates with the valve bore and the bypass line 3f so as to allow a supply of the ATF directly to the lubrication-requiring transmission portions 7 and 8 through the bypass line 3f by bypassing the oil cooler 5. A motor-side opening (right-side opening in FIG. 4) of the valve bore, located adjacent to the bypass port 16, forms a drain port that drains the ATF from the D-range port 13 as will be explained below.

Each of the line pressure port 12, the D-range port 13, the R-range port 14 and the drain port 15 is formed circularly around the valve bore. By contrast, the bypass port 16 is formed in a spot-like manner in one side (upper side in FIG. 1B) of an end of the spool accommodation portion 11 and located adjacent to the D-range port 13 and nearer to the motor 31 than the D-range port 13. In the present embodiment, the D-range port 13 has extended portions 13a located at a position corresponding to the bypass port 16 in an axial direction of the valve spool 20 on both sides of the bypass port 16 as shown in FIGS. 1A, 1B and 1C.

Figure 3:
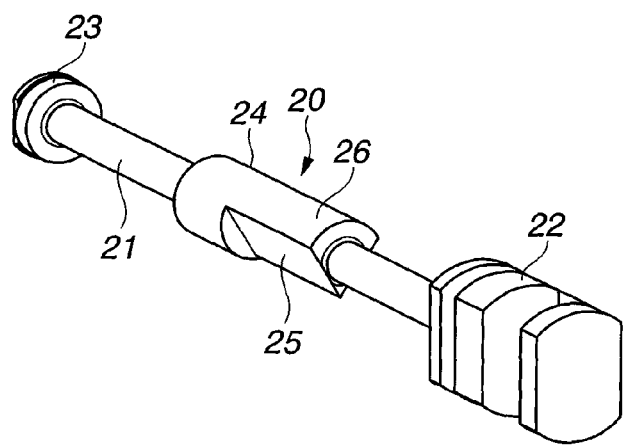
FIG. 3 is a perspective view of a valve spool of the switching valve of FIGS. 1A, 1B and 1C.

As shown in FIGS. 1B and 3, the valve spool 20 has a spool shaft 21 inserted into the valve bore and connected at one end 22 thereof to the motor 31, a R-range land 23 located on an opposite end of the spool shaft 21 from the motor connection end 22 so as to move in the vicinity of the R-range port 14 and a D-range land 24 located on a middle portion of the spool shaft 21 so as to move in the vicinity of the D-range port 13. The D-range land 24 has a cylindrical surface portion 26 formed on one side thereof facing the bypass port 16 so as to close the bypass port 16 and a cutaway surface portion or portions 25 formed on the circumferentially opposite side from the bypass port 16 so as to allow fluid communication from the D-range port 13 (more specifically, the extended portions 13a of the D-range port 13) to the motor-side opening of the valve bore. In the present embodiment, two cutaway surface portions 25 are formed in a certain direction on an end of the D-range land 24 near to the motor connection end 22 and arranged symmetrically with respect to a vertical plane passing through the center of the bypass port 16 in FIGS. 1B, 1C and 3. Even when the D-range port 13 is held into communication with the motor-side opening of the valve bore via the cutaway surface portions 25 to drain the ATF from the D-range port 13, the bypass port 16 is kept closed by the cylindrical surface portion 25 to interrupt communication between the bypass port 16 and the valve bore and thereby prevent the ATF supplied to the lubrication-requiring transmission portions 7 and 8 from being drained from the bypass port 16.

In the above valve configuration, the manual valve 1 (valve spool 20) has a plurality of operating positions such as a P-range operating position, a R-range operating position, a N-range operating position and a D-range operating position corresponding to the respective operating positions of the shift lever 34 (i.e. the transmission shift ranges) and additionally a bypass position located adjacent to the D-range operating position. As is seen in FIGS. 2 and 4B to 4G, these operating positions are arranged in order of mention.

The motor 31 is connected to the motor connection end 22 of the spool shaft 21 of the valve spool 20 so as to axially move the valve spool 20 in the valve bore. The form of the motor 31 is not particularly restricted. The motor 31 can be in the form of a rotary motor or a linear motor. When the motor 31 is a rotary motor, the valve spool 20 is actuated by the motor 31 via a power conversion/transmission mechanism. (The power conversion/transmission mechanism converts a rotation of the motor 31 to a linear motion and transmits the linear motion to the valve spool 30.) When the motor 31 is a linear motor, the valve spool 20 is actuated by the motor 31 directly or via a power transmission mechanism.

Referring again to FIG. 2, the automatic transmission system also includes a motor encoder or position sensor 33 for detecting an operating angle or position of the motor 31, a shift position sensor 34a (as a shift range detection unit) for detecting the position of the shift lever 34, i.e., the selected shift range of the transmission and an operating parameter detection unit 35 for detecting a given operating parameter of the transmission to judge a lubrication state of the transmission. In the present embodiment, the operating parameter detection unit 35 is an oil temperature sensor 35 for detecting a temperature T of the ATF as the transmission operating parameter, which is related to a viscosity of the ATF.

The switchover control unit 32 is configured to monitor the operating condition of the motor 31 based on detection signals (electric signals) from the sensors 33, 34a and 35 and generate a control signal (electric signal) to control the motor 31 to actuate the manual valve 1 (valve spool 20). As shown in FIGS. 1B and 2, the switchover control unit 32 characteristically has a judgment section 32a to judge whether the transmission is in a low lubrication state in which the amount of the ATF supplied to the lubrication-requiring transmission portions 7 and 8 is smaller than a required amount based on the given operating parameter of the transmission and, at the time the judgment section 32a judges that the transmission is in the low lubrication state, controls the motor 31 to switch the manual valve 1 to the bypass position so as to supply the ATF from the manual valve 1 to the lubrication-requiring transmission portions 7 and 8 through the bypass line 3f by bypassing the oil cooler 5 in the present embodiment.

It is a known fact that the ATF increases in viscosity with decrease in temperature and decreases in flow rate with increase in viscosity. In other words, a low temperature state of the ATF in which the temperature T of the ATF is lower than or equal to a threshold temperature level Tth corresponds to a high viscosity state of the ATF in which the viscosity of the ATF is higher than or equal to a threshold viscosity level and, by extension, to the low lubrication state of the transmission in which the amount of the ATF supplied to the lubrication-requiring transmission portions 7 and 8 is smaller than the required amount. The judgment section 32a thus estimates the viscosity state of the ATF and judges that the transmission is in the low lubrication state when the ATF is in the low temperature based on the oil temperature signal from the oil temperature sensor 35.

As explained above, the normal lubricating oil supply line passes through the oil cooler 5. The ATF, if supplied through such a lubricating oil supply line without bypassing the oil cooler 5 in the low temperature state, remains low in temperature and generates high viscous drag. The lubricating oil supply line also increases in length with the passage through the oil cooler 5 and results in high flow resistance. Due to high viscous drag and flow resistance, there arises a problem of insufficient supply of the ATF to the lubrication-requiring transmission portions 7 and 8 in the low temperature state. By contrast, the bypass line 3f has a length shorter than the normal lubricating oil supply line and allows a temperature rise in the ATF by bypassing the oil cooler 5. With the supply of the ATF through the bypass line 3f in the low temperature state, it becomes thus possible to reduce the viscous drag and flow resistance of the ATF, increase and secure the amount of the ATF supplied to the lubrication-requiring transmission portions 7 and 8 and prevent insufficient lubrication of these lubrication-requiring transmission portions 7 and 8.

The ATF supply control of the automatic transmission system is herein performed as follows.

First, the switchover control unit 32 checks the position of the shift lever 34, i.e., the selected shift range of the transmission based on the shift position signal from the shift position sensor 34a.

Figure 4A:
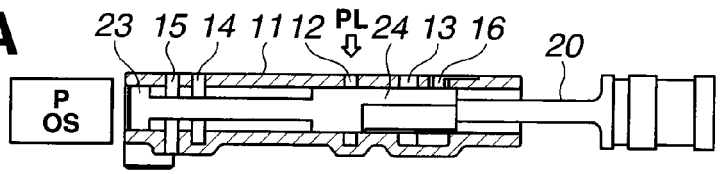
FIGS. 4A to 4H are section views showing operating positions of the switching valve of the automatic transmission system according to one embodiment of the present invention.
Figure 4B:
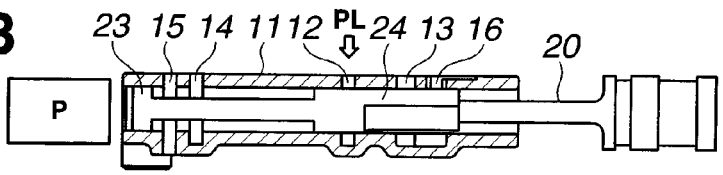

When the shift lever 34 is shifted to the P-range position, the switchover control unit 32 controls the motor 31 to switch the manual valve 1 (valve spool 20) to the P-range operating position as shown in FIG. 4B. In the P-range operating position, the line pressure port 12 is closed by the D-range land 24 to cut off the supply of the line pressure from the pressure regulator valve 6a through the hydraulic line 3b. The bypass port 16 is also closed by the cylindrical surface portion 26 of the D-range land 24 to stop the flow of the ATF into and out of the bypass line 3f. The D-range port 13 is brought into communication with the opening of the valve bore via the cutaway surface portions 25 of the D-range land 24 to drain the ATF from the D-range port 13. The R-range port 14 is also brought into communication with the drain port 15 to drain the ATF from the R-range port 14.

Figure 4C:
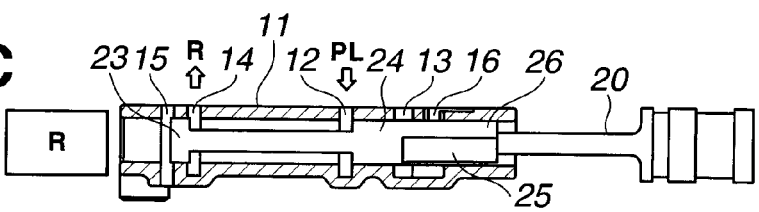

When the shift lever 34 is shifted to the R-range position, the switchover control unit 32 controls the motor 31 to switch the manual valve 1 (valve spool 20) to the R-range operating position as shown in FIG. 4C. In the R-range operating position, the line pressure port 12 is opened to introduce the line pressure from the hydraulic line 3b into the valve bore. The R-range port 14 is opened, with the drain port 15 closed by the R-range land 23, to supply the line pressure to the R-range transmission actuator 9b through the hydraulic line 3h. The D-range port 13 is kept in communication with the opening of the valve bore via the cutaway surface portions 25 of the D-range land 24 to drain the ATF from the D-range port 13. The bypass port 16 is closed by the cylindrical surface portion 26 of the D-range land 24 to stop the flow of the ATF into and out of the bypass line 3e.

Figure 4D:
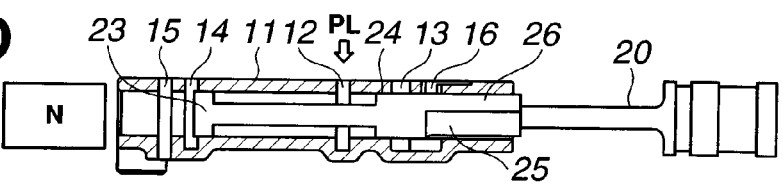

When the shift lever 34 is shifted to the N-range position, the switchover control unit 32 controls the motor 31 to switch the manual valve 1 (valve spool 20) to the N-range operating position as shown in FIG. 4D. In the N-range operating position, the line pressure port is opened to introduce the line pressure from the hydraulic line 3b into the valve bore. The D-range port 13 is kept in communication with the opening of the valve bore via the cutaway surface portions 25 of the D-range land 24 to drain the ATF from the D-range port 13. The R-range port 14 is brought into communication with the drain port 15 to drain the ATF from the R-range port 14. Further, the bypass port 16 is closed by the cylindrical surface portion 26 of the D-range land 24 to stop the flow of the ATF into and out of the bypass line 3e. With this, the hydraulic power transmission path is disconnected.

Figure 5:
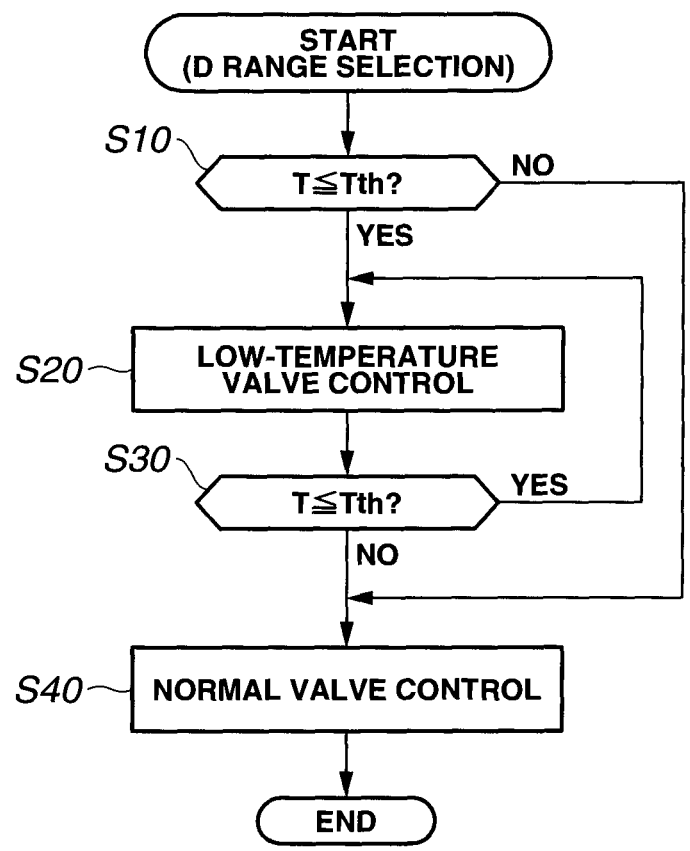
FIG. 5 is a flowchart for drive range operation control of the switching valve of the automatic transmission system according to one embodiment of the present invention.

The switchover control unit 32 executes a D-range valve control program as shown in FIG. 5 when the shift lever 34 is shifted to the D-range position.

At step S10, the control unit 32 causes the judgment section 32a to judge whether the ATF temperature T is lower than or equal to the threshold temperature level Tth (i.e., whether the ATF is in the low temperature state) based on the oil temperature signal from the oil temperature sensor 35. If the ATF temperature T is lower than or equal to the threshold temperature level Tth, the program control proceeds to step S20. If the ATF temperature T is higher than the threshold temperature level Tth, the program control proceeds to step S40.

Figure 4E:
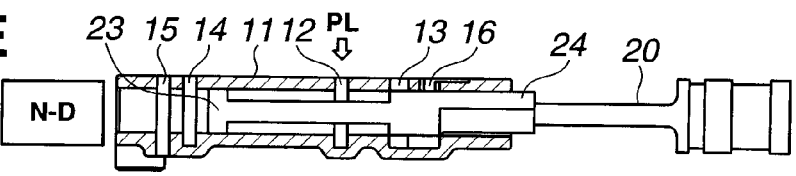
Figure 4F:
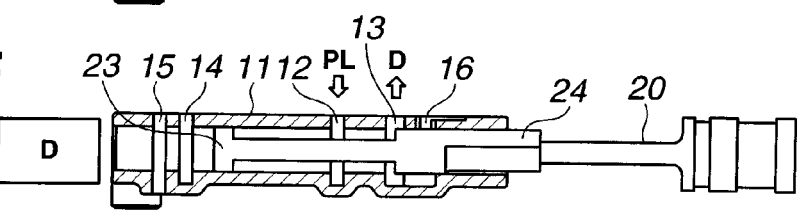
Figure 4G:
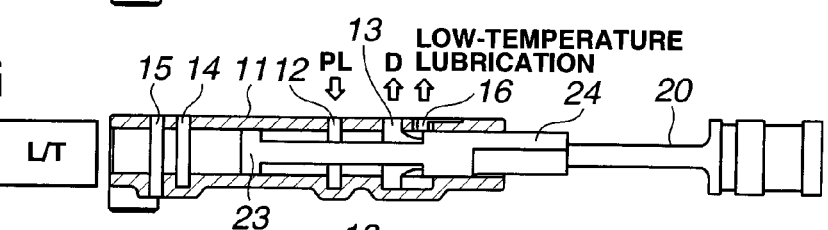

At step S20, the switchover control unit 32 controls the motor 31 to switch the manual valve 1 (valve spool 20) to the bypass position as shown in FIG. 4G upon judging that the ATF is in the low temperature state. Namely, the manual valve 1 (valve spool 20) is switched to the bypass position only at the time the transmission is judged as being in the low lubrication state upon selection of the D range. In the bypass position, the line pressure port 12, the D-range port 13 and the bypass port 16 are opened to receive the line pressure from the line pressure port 12, supply a part of the line pressure from the bypass port 16 to the lubrication-requiring transmission portions 7 and 8 through the bypass line 3f and hydraulic lines 3d and 3e, by bypassing the oil cooler 5, and supply the remaining part of the line pressure from the D-range port 13 to the D-range transmission actuator 9a through the hydraulic line 3h. The program control then proceeds to step S30.

At step S30, the control unit 32 (judgment section 32a) judges whether the ATF temperature T is still lower than or equal to the threshold temperature level Tth based on the oil temperature signal from the oil temperature sensor 35. If the ATF temperature T is lower than or equal to the threshold temperature level Tth, the program control goes back to step S20. If the ATF temperature T is higher than the threshold temperature level Tth, the program control proceeds to step S40.

At step S40, the switchover control unit 32 controls the motor 31 to switch the manual valve 1 (valve spool 20) to a N-D transient operating position as shown in FIG. 4E and then to the D-range operating position as shown in FIG. 4F upon judging that the ATF is in a normal temperature state other than the low temperature state. In the D-range operating position, the bypass port 16 is closed by the D-range land 24 to stop the supply of the ATF to the lubrication-requiring transmission portions 7 and 8. The line pressure port 12 and the D-range port 13 are opened to receive the line pressure from the line pressure port 12 and supply the line pressure from the D-range port 13 to the D-range transmission actuator 9a through the hydraulic line 3h.

Figure 4H:
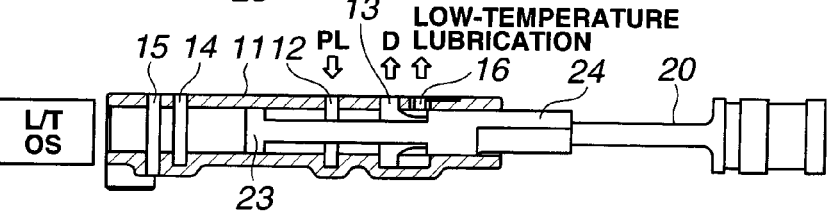

Although the basic operation range of the valve spool 20 extends from the P-range operating position of FIG. 4B to the low temperature operating position of FIG. 4G, it is mechanically feasible to move the valve spool 20 to positions slightly out of the basic operating range as shown in FIGS. 4A and 4H. Thus, the switchover control unit 32 may alternatively be configured to: judge that the ATF is in a low temperature state when the ATF temperature T is in the range of a first threshold temperature level to a second threshold temperature level (lower than the first threshold temperature level); judge that the ATF is in an extreme low temperature state when the ATF temperature T is lower than the second threshold temperature level; switch the valve spool 20 to the low temperature operating position of FIG. 4G in the low oil temperature state; and switch the valve spool 20 to the extreme low temperature operating position of FIG. 4H so as to widen the opening of the bypass valve 16 and increase the amount of flow of the ATF to the lubrication-requiring transmission portions 7 and 8 in the extreme low oil temperature state.

In this way, the automatic transmission system opens the bypass line 3f to supply the hydraulic fluid from the manual valve 1 as the lubricating oil to the lubrication-requiring transmission portions 7 and 8 through the bypass line 3f by bypassing the oil cooler 5 when the transmission is in the low lubrication state. It is thus possible to increase and secure the amount of the lubricating oil supplied to the lubrication-requiring transmission portions 7 and 8.

The automatic transmission system uses the manual valve 1 to control the opening and closing of the bypass line 3f. As the manual valve 1 is originally mounted on the transmission system to control the supply of the line pressure to the hydraulic transmission actuators 9, there is no need to provide a dedicated cooler bypass valve and component additions associated therewith. The use of such an existing manual valve 1 makes it possible to avoid increases in system size and parts count. In addition, this manual valve 1 is controlled under the electric signal from the switchover control unit 32 via the motor 31. The condition of switching the manual valve 1 to the bypass position (i.e. the opening/closing condition of the bypass line 30 can be thus set optimally to provide a higher degree of flexibility in lubricating oil supply to the lubrication-requiring transmission portions 7 and 8.

The automatic transmission system uses the oil temperature sensor 35 as the operating parameter detection unit and judges the lubrication state of the transmission based on the operating parameter read from the sensor 35. The use of such a relatively low-cost sensor 35 also makes it possible avoid increases in system cost.

The manual valve 1 is switched to the bypass position so as to supply a part of the ATF as the lubricating oil to the lubrication-requiring transmission portions 7 and 8 by bypassing the oil cooler 5 and supply the remaining part of the ATF as the hydraulic fluid to the D-range transmission actuator 9a when the transmission is judged as being in the low lubrication state upon selection of the D range. When the transmission is judged as being in a normal lubrication state other than the low temperature state upon selection of the D range, the manual valve 1 is switched to the drive-range operating position to supply the ATF to the D-range transmission actuator 9a and stop the supply of the ATF to the lubrication-requiring transmission portions 7 and 8. As explained above, the flow of the ATF through the oil cooler 5 in the low-temperature/high-viscosity state leads to insufficient supply of the ATF to the lubrication-requiring transmission portions 7 and 8 due to high flow resistance and viscous drag. This insufficient ATF supply problem can however be avoided by supplying the ATF from the manual valve 1 to the lubrication-requiring transmission portions 7 and 8 through the bypass line 3f. At the same time, the supply of the required amount of the ATF to the D-range transmission actuator 9a can be secured to perform proper D-range shift control of the transmission as the amount of leakage of the ATF in the vicinity of the manual valve 1 becomes reduced due to high viscous resistance in the low-temperature/high-viscosity state. In the normal temperature/viscosity state, it is unlikely that the supply of the ATF to the lubrication-requiring transmission portions 7 and 8 becomes insufficient due to low viscous drag even with the flow of the ATF through the oil cooler 5. On the other hand, the amount of leakage of the ATF in the vicinity of the manual valve 1 becomes increased due to low viscous resistance in the normal temperature/viscosity state. It is thus rather effective to stop the supply of the ATF from the manual valve 1 to the lubrication-requiring transmission portions 7 and 8 through the bypass line 3f and supply the ATF through the normal lubricating oil supply line without bypassing the oil cooler 5 in order to prevent overheating of the ATF and to secure the supply of the requiring amount of the ATF to the D-range transmission actuator 9a assuredly. The above hydraulic supply control makes it possible to decrease the load of the oil pump 2 for reductions in pump capacity and size. As the manual valve 1 generally has its D-range operating position and R-range operating position on axially opposite ends thereof, the bypass position can be readily added to the manual valve 1 at a location adjacent to the D-range operating position by lengthen the existing manual valve 1 without substantial changes in valve design.

Further, the valve spool 20 is formed with the cylindrical surface portion 26 and the cutaway surface portions 25. Even when the D-range port 13 is brought into communication with the valve bore opening via the cutaway surface portions 25 to drain the ATF from the D-range port 13 during selection of the P, R or N range, the bypass port 16 is kept closed by the cylindrical surface portion 26 to interrupt communication between the bypass port 16 and the valve bore opening. The ATF supplied to the lubrication-requiring transmission portions 7 and 8 can be thus prevented from being drained from the bypass port 16 in the P, R or N range. The forms of the spool accommodation portion 11 (spool chamber) and the valve spool 20 are not limited to the above. The spool accommodation portion 11 (spool chamber) and the valve spool 20 can be adapted to any other forms that interrupt communication between the bypass port 16 and the valve bore opening while providing communication between the D-range port 13 and the valve bore opening.

Furthermore, the orifice 3g is arranged in the bypass line 3f. In the event of a malfunction in the motor 31 or the control unit 32, the manual valve 1 may be mistakenly switched to the bypass position even though the transmission is not in the low lubrication state. In such a case, the flow of the ATF from the manual valve 1 to the lubrication-requiring transmission elements 7 and 8 can be regulated by the orifice 3g to prevent excessive decrease in the amount of the ATF supplied to the hydraulic transmission actuator 9.

As described above, it is possible in the present embodiment to ensure the supply of the lubricating oil to the lubrication-requiring transmission portions 7 and 8 through the bypass line 3f and prevent insufficient lubrication of these lubrication-requiring transmission portions 7 and 8 for improvement in transmission durability without substantial changes in equipment design and increases in system size and cost and parts count.

The entire contents of Japanese Patent Application No. 2008-218543 (filed on Aug. 27, 2008) are herein incorporated by reference.

Although the present invention has been described with reference to the above-specific embodiment, the invention is not limited to this exemplary embodiment. Various modification and variation of the embodiment described above will occur to those skilled in the art in light of the above teachings.

The bypass port 16 may alternatively be located to the R-range port 14 or any other valve port although the bypass port 16 is located adjacent to the D-range port 13 in the above embodiment. Alternatively, it is conceivable to provide a plurality of bypass ports 16 adjacent to the respective valve ports.

While one end of the bypass line 3f is connected to the bypass port 16, the other end of the bypass line 3 are not necessarily directly connected to the hydraulic lines 3d and 3e and can be connected to any downstream position from the oil cooler 5 on the lubricating oil supply line.

The operating parameter detection unit is not particularly restricted as long as it is capable of detecting any viscosity-related operating parameter of the transmission. For example, the automatic transmission system may use a coolant temperature sensor for detecting a temperature of engine coolant, in place of the oil temperature sensor 35, as the operating parameter detection unit and judge that the lubricating oil is in the high viscosity state, i.e., the transmission is in the low lubrication state when the coolant temperature is lower than a threshold temperature level. Further, the automatic transmission system can use a plurality of operating parameter detection units to obtain multiple transmission operating parameters and judge the lubrication state of the transmission based on these multiple transmission operating parameters. It is conceivable to previously determine by experiment an operating condition of the transmission under which the amount of lubricating oil supplied to the lubrication-requiring portions 7 and 8 becomes insufficient and switch the manual valve 1 to the bypass position by judging the transmission as being in the low lubrication state upon satisfaction of such a predetermined transmission operating condition, or upon satisfaction of the predetermined transmission operating condition as well as by comparison of the transmission operating parameter with the threshold value.

The scope of the invention is defined with reference to the following claims.

What is claimed is:

1. An automatic transmission system, comprising:
    a transmission having a plurality of transmission elements with lubrication-requiring portions and hydraulic actuators therefor;
    a hydraulic circuit having a switching valve that switches a supply of hydraulic fluid to the hydraulic actuators;
    a valve actuator that actuates the switching valve;
    an oil cooler disposed on a lubricating oil supply line to the lubrication-requiring portions;
    a shift range detection unit that detects a shift range of the transmission selected by a driver; and
    a control unit that controls the valve actuator to actuate the switching valve in accordance with the selected transmission shift range,
    the switching valve having a bypass position to supply the hydraulic fluid from the switching valve to the lubrication-requiring portions by bypassing the oil cooler; and
    the control unit having a judgment section to judge whether the transmission is in a low lubrication state in which an amount of the lubricating oil supplied to the lubrication-requiring portions is smaller than a given amount based on a given operating parameter of the transmission and being configured to control the valve actuator to switch the switching valve to the bypass position at the time the judgment section judges that the transmission is in the low lubrication state.

2. The automatic transmission system according to claim 1, wherein the given operating parameter is related to a viscosity of the lubricating oil; and wherein the judgment section judges based on the given operating parameter that the transmission is in the low lubrication state when the lubricating oil is in a high viscosity state in which the viscosity of the lubricating oil is higher than or equal to a threshold viscosity level.

3. The automatic transmission system according to claim 1, wherein the given operating parameter is a temperature of the lubricating oil; and wherein the judgment section judges that the transmission is in the low lubrication state when the temperature of the lubricating oil is lower than or equal to a threshold temperature level.

4. The automatic transmission system according to claim 1, wherein the switching valve has a drive-range operating position corresponding to a drive range of the transmission and located adjacent to the bypass position, so as to supply the hydraulic fluid to any of the hydraulic actuators for the drive range when the switching valve is in the drive-range operating position and to supply a part of the hydraulic fluid to the lubrication-requiring portions by bypassing the oil cooler and another part of the hydraulic fluid to said any of the hydraulic actuators for the drive range when the switching valve is in the bypass position; and wherein the control unit controls the valve actuator to switch the switching valve to the bypass position at the time the judgment section judges that the transmission is in the low lubrication state upon selection of the drive range and to switch the switching valve to the drive-range operating position at the time the judgment section judges that the transmission is not in the low lubrication state upon selection of the drive range.

5. The automatic transmission system according to claim 4, wherein the switching valve has a spool chamber, a valve spool movably accommodated in the spool chamber and a plurality of valve ports open to the spool chamber and including a drive-range port that supplies the hydraulic fluid to said any of the hydraulic actuators for the drive range, a bypass port that supplies the hydraulic fluid to the lubrication-requiring portions and a drain port located adjacent to the bypass port to drain the hydraulic fluid; and the form of at least one of the valve spool and the spool chamber is adapted to interrupt communication between the bypass port and the drain port while providing communication between the drive-range port and the drain port.

6. The automatic transmission system according to claim 5, wherein the drive-range port has a portion corresponding in position to the bypass port in an axial direction of the valve spool; and the valve spool has a spool shaft in the spool chamber and a land formed on the spool shaft; and the land has a first portion formed on one side thereof facing the bypass port so as to close the bypass port by the first portion and a second portion formed on the other side thereof so as to provide communication between the said portion of the drive-range port and the bypass port via the second portion.

7. The automatic transmission system according to claim 4, wherein the hydraulic circuit has a bypass line that bypasses the oil cooler and extends from the switching valve to the lubrication-requiring portions and an orifice disposed in the bypass line.

8. A hydraulic control device for an automatic transmission, the automatic transmission having a plurality of transmission elements with lubrication-requiring portions and hydraulic actuators therefor and an oil cooler to cool lubricating oil, the hydraulic control device comprising:
    a bypass line bypassing the oil cooler and extending to the lubrication-requiring portions;
    a switching valve having hydraulic fluid supply ports that supply hydraulic fluid to the hydraulic actuators and a lubrication port that communicates with the bypass line to allow a supply of the hydraulic fluid to the lubrication-requiring portions through the bypass line;
    a shift range detection unit for detecting a shift range of the transmission selected by a driver;
    a parameter detection unit for detecting a given parameter of the transmission; and
    a control unit for judging a lubrication state of the transmission based on the given transmission parameter and controlling the switching valve to selectively open and close the hydraulic fluid supply ports and the lubrication port depending on the selected shift range of the transmission and the lubrication state of the transmission.

* * * * *